United States Patent [19]

Phillips et al.

[11] Patent Number: 5,077,611

[45] Date of Patent: Dec. 31, 1991

[54] UNIVERSAL IMAGE INTENSIFIER TUBE

[75] Inventors: Earle N. Phillips, Roanoke; Roy H. Holmes, Salem; Roger D. Whiddon, Roanoke; William H. Jamison, Covington, all of Va.

[73] Assignee: ITT Corporation, New York, N.Y.

[21] Appl. No.: 601,292

[22] Filed: Oct. 22, 1990

[51] Int. Cl.[5] .................... H04N 5/30

[52] U.S. Cl. .................... 358/211; 250/213 VT; 439/166

[58] Field of Search .................... 358/211, 225, 209; 350/538; 250/213 VT; 439/166, 170–174; 351/158

[56] References Cited

U.S. PATENT DOCUMENTS

| | | | |
|---|---|---|---|
| 4,067,045 | 1/1978 | Provost et al. | 358/211 |
| 4,254,437 | 3/1981 | Funk et al. | 358/211 |
| 4,463,252 | 7/1984 | Brennan et al. | 250/213 VT |
| 4,960,393 | 8/1990 | Stoll et al. | 439/166 |

*Primary Examiner*—James J. Groody
*Assistant Examiner*—Glenton B. Burgess
*Attorney, Agent, or Firm*—Arthur L. Plevy; Patrick M. Hogan; Peter A. Abruzzese

[57] ABSTRACT

A device for intensifying light images which includes an image intensifier tube assembly that is retrofittable to two different existing housings. There is a first electrical contact for electrically connecting to electrical supply contacts when positioned in the first different housing and a second electrical contact for electrically connecting to electrical supply contacts when positioned in the second different housing. The tube assembly has first spacer for effecting a predetermined spacing between the tube assembly and the first housing when positioned in the first housing, and a second spacer for effecting a predetermined spacing between the tube assembly and the second housing when positioned therein. The first spacer is inactive to control spacing when in the second housing and the second spacer is inactive for controlling spacing when in the first housing.

10 Claims, 4 Drawing Sheets

UNIVERSAL IMAGE INTENSIFIER TUBE

BACKGROUND OF THE INVENTION

1. Field of the Invention

The present invention relates to an image intensifier tube, and more particularly to a universal image intensifier tube which may be retrofitted interchangeably to more than one type of existing housing.

2. Description of the Prior Art

Image intensifier tubes used to enhance night vision have been known and practiced for many years. Frequently, image intensifier equipment, such as night vision goggles, are used by the military and have been produced in large numbers corresponding to the numerous military personnel who employ them. Since image intensifiers are sophisticated and expensive devices, large amounts of money has been invested by the military in the equipment presently in the field. As with most sophisticated equipment, image intensifiers have gone and continue to go through many stages of development and improvement. A variety of models therefore exist in the field. Normally, the improvements to image intensifier equipment occurs with respect to the image intensifier tube rather than to the housing in which it is carried. The housings are typical of rugged construction to withstand harsh treatment and at the same time protect the sensitive intensifier tube that they contain. As such, the housings in themselves are expensive to produce and retain their effectiveness through various stages of development of the intensifier tubes. The housings further include optical lens and the battery power source. Substantial savings would therefore result if a universal tube could be constructed for reception within different existing housings. For example, the U.S. Army has procured large quantities of two different single tube night vision goggles. These systems are designated the AN/PVS-7A and AN/PVS-7B systems. The two systems use different image intensifier tubes, i.e., the MX-10130A/UV and the MX-10130B/UV respectively. The AN/PVS-7B system and both tubes are manufactured by ITT Defense Technology Corporation, the Assignee of the present invention. Although similar in size, shape and function, the aforesaid tubes are substantially different with respect to electrical contacts, external dimensions and fiber optic output radius of curvature such that they are not interchangeable. The need for two different image intensifier tubes for the aforesaid night vision goggles complicates the logistics and increases the expense of lifecycle support for the two similar systems. It is therefore an object of the present invention to provide a universal image intensifier tube which is form fit and function interchangeable with more than one existing housing to thereby reduce lifecycle support effort and expense.

SUMMARY OF THE INVENTION

The problems and disadvantages associated with the conventional techniques and devices utilized for intensifying light images are overcome by the present invention which includes a universal image intensifier tube assembly that is retrofittable to two or more different existing housings. First electrical contacts for electrically connecting to electrical supply contacts when positioned in a first of said two or more different housings are disposed on the tube assembly. Second electrical contacts for electrically connecting to electrical supply contacts when positioned in a second of said two or more different housings are also disposed on the tube assembly. The tube assembly has first spacer means for effecting a predetermined spacing between the tube assembly and the first housing when positioned in the first housing, and second spacer means for effecting a predetermined spacing between the tube assembly and the second housing when positioned in the second housing. The first spacer means are inactive to control spacing when in the second housing and the second spacer means are inactive for controlling spacing when in the first housing.

BRIEF DESCRIPTION OF THE FIGURES

For a better understanding of the present invention, reference is made to the following detailed description of an exemplary embodiment considered in conjunction with the accompanying drawing, in which.

FIGS. *2a* through *2c* are a comparative series of back views in elevation of three different image intensifier tubes, FIGS. *2a* and *2b* being illustrations of prior art devices, and FIG. *2c* illustrating a device in accordance with the present invention.

Figure 2A:
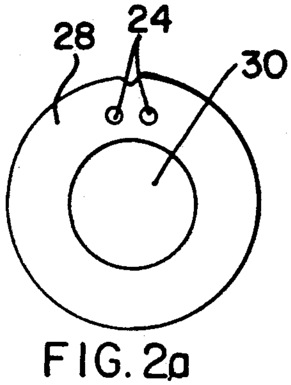
FIG. 2a PRIOR ART
Figure 2B:
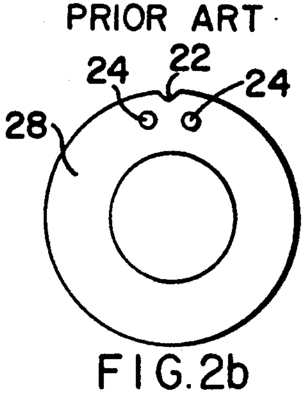
Figure 2C:
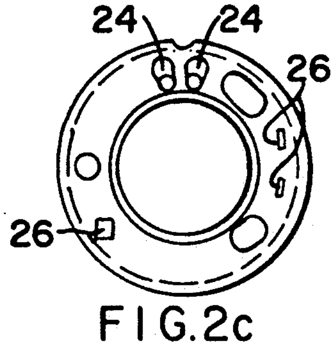
Figure 2D:
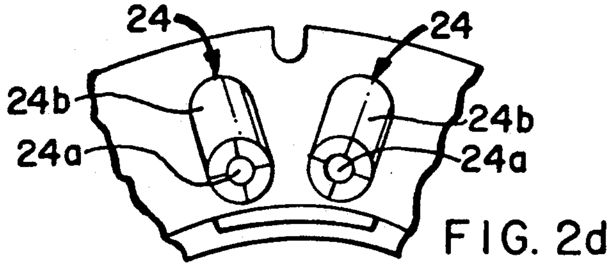

FIG. 2D is an enlarged fragmented view of the electrical contact area of the intensifier tube illustrated in FIG. *2c*.

Figure 1:
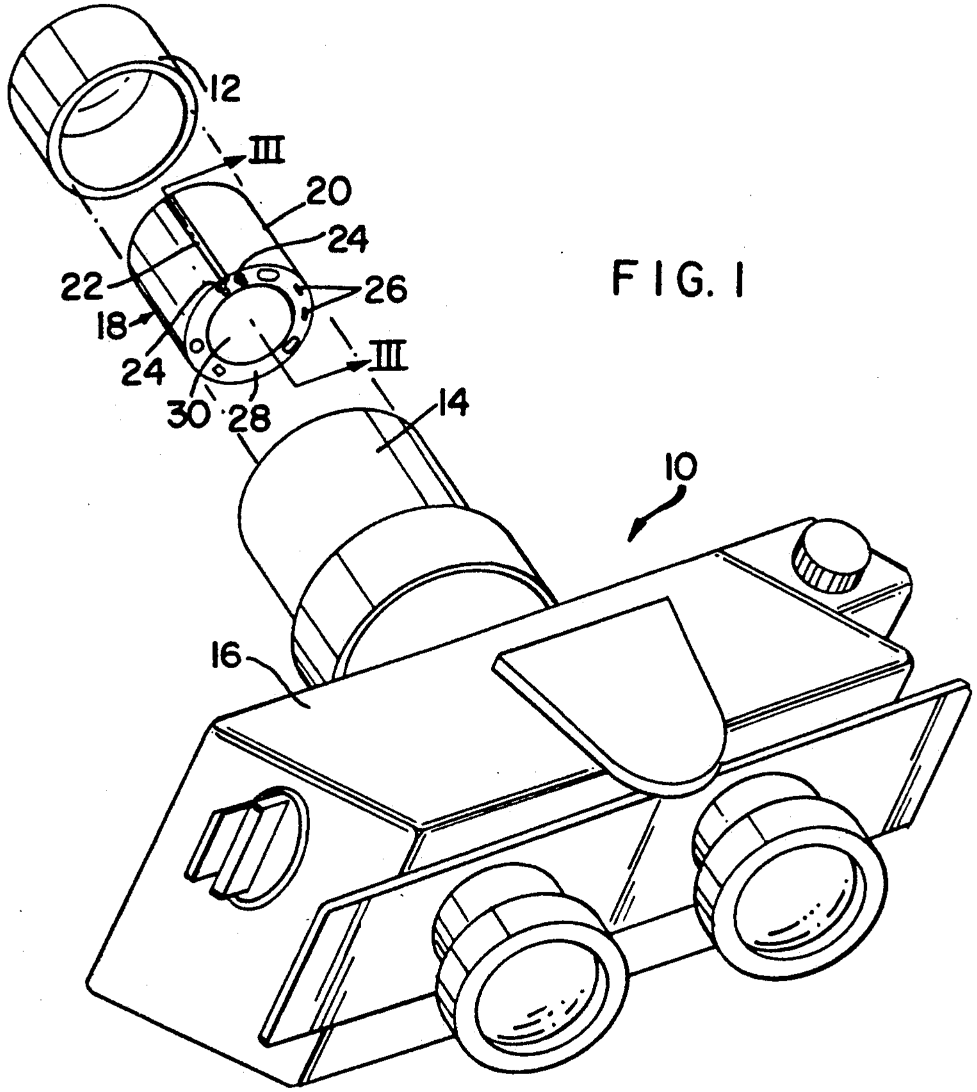
FIG. 1 PRIOR ART
FIG. 1 is an exploded perspective view of night vision goggles employing an image intensifier tube assembly constructed in accordance with the present invention.
Figure 3:
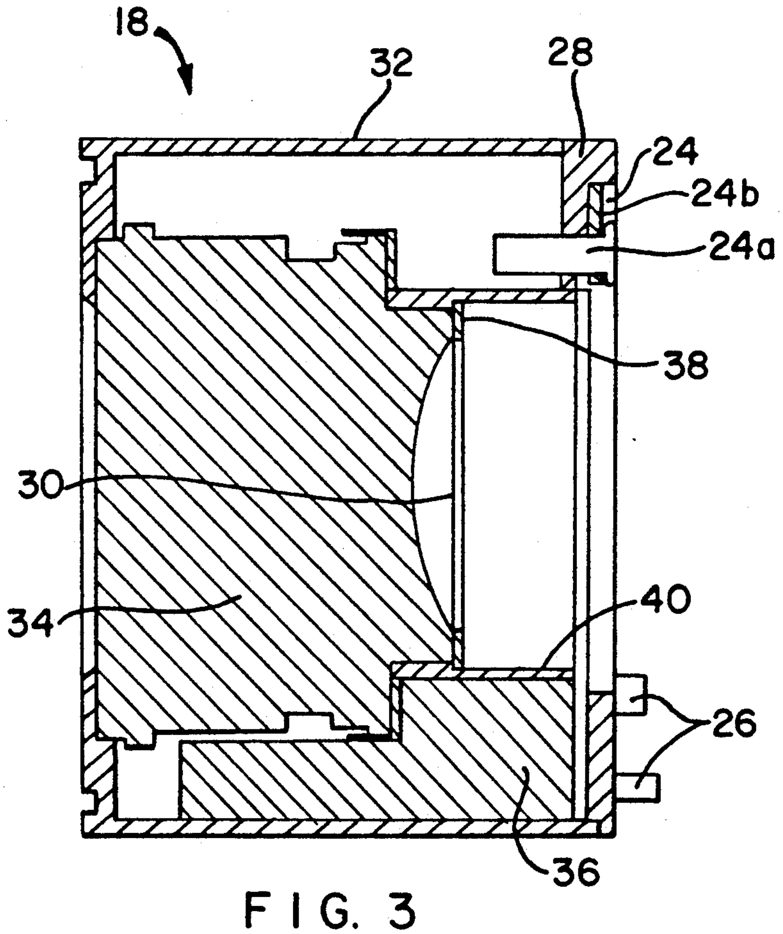

FIG. 3 is a cross-sectional view of the image intensifier tube assembly depicted in FIG. 1 taken along section line III—III and looking in the direction of the arrows.

FIGS. *4a* and *4b* are cross-sectional views of the device as shown in FIG. 3 retrofitted to a pair of different existing housings, i.e., those housings which would receive the tubes shown in FIGS. *2a* and *2b*.

DETAILED DESCRIPTION OF THE FIGURES

FIG. 1 shows night vision goggles 10 with the front protective optical lens 12 unscrewed from the tubular front barrel 14 of the binocular housing 16 and an image intensifier tube assembly 18 exploded out from its normal position within barrel 14. The tube assembly 18 has an outer shell 20 with an air equalization and positional orientation groove 22 along its length as is already known in the art. A pair of electrical contacts 24 and a series of spacers 26, are disposed on the backplate 28 of the tube assembly 18 peripherally about the output aperture 30 as shall be described at length below. When the tube assembly 18 is placed within the barrel 14 the groove 22 orients it to ensure that the electrical contacts 24 mate with a pair of internal electrical power supply terminals (not shown) within the binocular housing 16. Light enters the binoculars through the front optical lens 12, passes into the tube assembly 18 where it is intensified and projected out the output aperture 30 where it is received and further processed optically by collimation, focusing, distribution, etc., in the binoculars to render an enhanced image.

Referring to FIG. *2a* through *2d*, a comparison between a pair of prior art backplates 28 (FIGS. *2a* and *2b*) and a backplate in accordance with the present invention (FIG. *2c*) can be made. FIG. *2a* illustrates a backplate 28 configuration that is currently used on intensifier tube assembly 18 designator of AN/PVS-7A. It can be observed in FIG. *2a* that the electrical contacts 24 on the backplate 28 are sockets for receiving a mating plug-type electrical power supply terminal projecting from the interior of the housing 16 and that they are disposed close to the output aperture 30. In FIG. 2b the electrical contacts 24 are disposed closer to the air equalization and orientation groove 22 and are flat contacts designed to mate with spring urged electrical power supply terminals projecting from the interior of the binocular housing 16. This configuration is currently employed on an intensifier tube designated MX-10130B and used in night vision binoculars AN/PVS-7B. FIGS. 2c and 2d illustrate a backplate 28 configuration in accordance with the present invention and incorporates dual compatibility electrical contacts 24 having both socket 24a and flat contacts 24b which could be utilized to mate with the electrical power supply terminals in the AN/PVS-7A or AN/PVS-7B binoculars. Three spacer members 26 project toward the viewer to ensure a proper mechanical fit of the universal tube assembly 18 illustrated in FIG. 2a to either of the aforementioned existing goggle housings 16 as shall be more fully described below.

Referring now to FIG. 3, a cross-sectional view of an intensifier tube assembly 18 constructed in accordance with the present invention reveals certain of the basic components of known image intensifiers, as well as, features unique to the present invention. A tube shell 32 surrounds and supports therein an intensifier tube 34 depicted without structural detail. A power supply 36 is contained within the shell 32 for converting an input voltage from, e.g., a battery, into a set of voltages required to power the various stages of the intensifier tube 34. The dual compatibility contacts 24 have both a flat contact 24b and a socket-type contact 24a. The contacts 24 are the means whereby contact is made between the internal power supply 36 and an electric power source external to the tube assembly (e.g., a battery), which would typically be contained within the binocular housing. The backplate 28 has a series of spacer members 26 projecting therefrom designed to abut against one of the existing binocular housings 16 into which the universal tube assembly 18 is to be placed but to penetrate the housing of another to provide a proper focal distance between the output aperture 30 and the next lens in the binocular system (typically a collimator which is not shown in this view). A collimator spacer 38 and a collimator sleeve 40 insures proper positioning of the coliimator relative to the output aperture for one of the binocular housings 16 as shall be further described below.

Figure 4A:
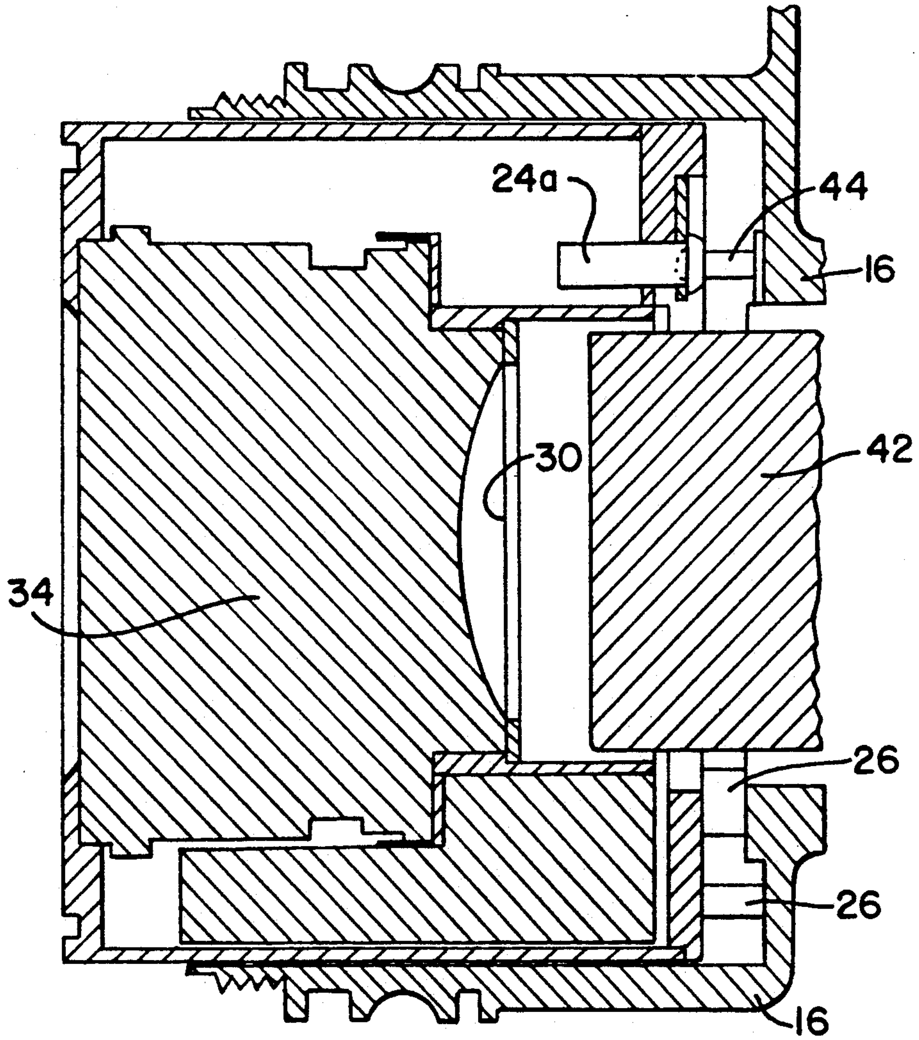
Figure 4B:
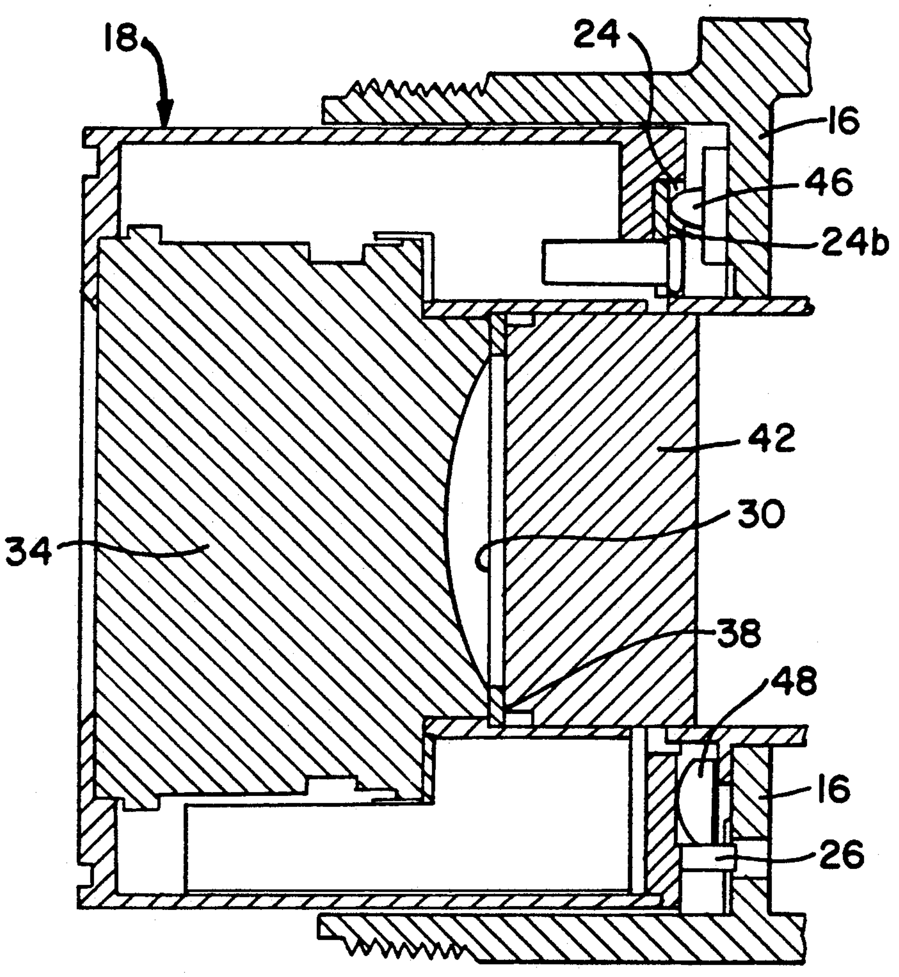

Referring now to FIGS. 4a and 4b, a universal tube assembly in accordance with the present invention is shown installed in two different binocular housings. In FIG. 4a the universal tube assembly is shown in place within an AN/PVS-7A binocular system. The AN/PVS-7A binocular system requires a spacing from the backplate to the optic output of 0.515±0.003 inches. This distance is essential to the proper operation of the intensifier, i.e., proper focusing and insures that the collimator 42 will be positioned correctly relative to the fiber optic output aperture 30. In the present invention, spacers 26 abut against the binocular housing of the AN/PVS-7A and insure that the proper collimator 42 spacing is maintained. It can be seen that the contact sockets 24a are correctly positioned to receive mating plugs 44 projecting from the interior of the binocular housing 16. In FIG. 4b the universal tube assembly 18 is shown positioned within an AN/PVS-7B goggle system. In this system the distance between the fiber optic output 30 and the collimator 42 must be maintained at 0.124±0.003 inches. The universal tube assembly 18 insures proper spacing by means of the collimator spacer ring 38 against which the collimator 42 abuts. A spring urged contact button 46 projects from the interior of binocular housing 16 and makes electrical contact with the flat contact area 24b on the tube assembly electrical contact 24. The spacers 26 are oriented and shaped to coincide with weight reduction drillings present in the binocular housing 16 and thus slide within them and do not disturb the seating of the collimator 42 against the collimator spacer ring 38. A spacer 26 previously visible in FIG. 4a is obscured by a screw head.

The optical output radius of the intensifier tube 34 of the universal tube assembly 18 was selected to be compatible with both binocular systems (normalized) given the respective distances from the collimator 42.

The present invention realizes the objective of being retrofittable to more than one existing binocular housing, while at the same time preserving resolution, field of view, magnification, focus and gain as well as weight and size specifications. As such, the present invention will permit substantial savings in lifecycle maintenance costs for image intensifiers utilizing a universal image intensifier tube assembly.

It should be understood that the embodiments described herein are merely exemplary and that a person skilled in the art may make many variations and modifications without departing from the spirit and scope of the invention as defined in the appended claims.

We claim:

1. A universal image intensifier tube assembly that is retrofittable to two or more different existing housings comprising:

a) first electrical contact means for electrically connecting to electrical supply contacts when positioned in a first of said two or more different housings;

b) second electrical contact means for electrically connecting to electrical supply contacts when positioned in a second of said two or more different housings;

c) first spacer means for effecting a predetermined spacing between said tube assembly and said first housing when said tube assembly is positioned in said first housing;

d) second spacer means for effecting a predetermined spacing between said tube assembly and said second housing when said tube assembly is positioned in said second housing, said first spacer means being inactive to control spacing when said tube assembly is positioned in said second housing, said second spacer means being inactive for controlling spacing when said assembly is positioned in said first housing.

2. The apparatus of claim 1, wherein said first and said second electrical contact means are each a pair of like contacts.

3. The apparatus of claim 2, wherein each of said like contacts of said first and said second pairs is in electrical continuity with one of said like contacts of the other said pair.

4. The apparatus of claim 3, when said first pair of contacts are flat and are adapted to conductively receive spring urged contacts disposed within the interior of said first housing, and said second pair of contacts are sockets for receiving therein plug contacts disposed within the interior of said second housing.

5. The apparatus of claim 4, wherein the optical output radius thereof is intermediate between the optical output radius of a first image intensifier tube adapted to fit into said first housing and a second image intensifier tube adapted to fit into said second housing.

6. The apparatus of claim 5, wherein said first and second housings are components of two different night vision goggle systems.

7. The apparatus of claim 5, wherein said first and second housings are components of two different weapon sight systems.

8. The apparatus of claim 5, wherein said first and second housings are components of two different pocket scope systems.

9. The apparatus of claim 5, wherein said first and second housings are components of two different low light television systems.

10. The apparatus of claim 5, wherein said first housing is that of night vision goggles designated AN/PVS-7A, and wherein said second housing is that of night vision goggles designated AN/PVS-7B.

* * * * *